United States Patent
Wilhelm et al.

(10) Patent No.: US 10,212,616 B2
(45) Date of Patent: *Feb. 19, 2019

(54) RF RESOURCE ALLOCATION DEVICE AND METHOD, AND RADIO COMMUNICATION SYSTEM

(71) Applicant: TOYOTA JIDOSHA KABUSHIKI KAISHA, Toyota-shi, Aichi-ken (JP)

(72) Inventors: Matthias Stephan Wilhelm, Tokyo (JP); Haris Kremo, Dublin (IE); Onur Altintas, Sunnyvale, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,884

(22) Filed: Dec. 21, 2017

(65) Prior Publication Data

US 2018/0115917 A1    Apr. 26, 2018

Related U.S. Application Data

(63) Continuation of application No. 15/429,522, filed on Feb. 10, 2017, now Pat. No. 9,888,396.

(30) Foreign Application Priority Data

Mar. 22, 2016    (JP) ................................. 2016-057573

(51) Int. Cl.
*H04W 72/00* (2009.01)
*H04W 24/02* (2009.01)
(Continued)

(52) U.S. Cl.
CPC ............ *H04W 24/02* (2013.01); *H04H 20/42* (2013.01); *H04L 5/0058* (2013.01);
(Continued)

(58) Field of Classification Search
CPC ... H04W 16/04; H04W 16/14; H04W 68/005; H04W 72/04; H04W 72/044;
(Continued)

(56) References Cited

U.S. PATENT DOCUMENTS 6,108,563 A * 8/2000 Shishino ............... H04W 68/00
455/414.1
6,965,576 B1   11/2005 Lee et al.
(Continued)

FOREIGN PATENT DOCUMENTS

CN    105340305 A    2/2016
CN    105357698 A    2/2016
(Continued)

OTHER PUBLICATIONS

Whitt et al. "Proposal by Google Inc. to Provide a TV Band Device Database Management Solution,".
(Continued)

*Primary Examiner* — Jean A Gelin
(74) *Attorney, Agent, or Firm* — Oliff PLC

(57) ABSTRACT

Provided is an RF resource allocation device that distributes to a mobile terminal a communication setting notification including a communication setting to be used in a radio communication. The device includes an acquisition unit configured to acquire a measurement result or an estimation result of communication conditions at a plurality of positions; a generation unit configured to determine for each region the communication setting to be used by the mobile terminal in the radio communication based on the communication conditions, and to generate the communication setting notification including the communication setting for each region; and a transmission unit configured to transmit the communication setting notification to the mobile terminal The acquisition of the communication conditions by the (Continued)

acquisition unit and the generation of the communication setting notification by the generation unit are executed repeatedly at predetermined time intervals.

15 Claims, 8 Drawing Sheets

(51) Int. Cl.
H04H 20/42 (2008.01)
H04L 12/26 (2006.01)
H04W 24/10 (2009.01)
H04W 72/12 (2009.01)
H04W 4/04 (2009.01)
H04L 5/00 (2006.01)
H04W 72/08 (2009.01)
H04L 29/06 (2006.01)

(52) U.S. Cl.
CPC ........ *H04L 5/0092* (2013.01); *H04L 43/0882* (2013.01); *H04W 4/046* (2013.01); *H04W 24/10* (2013.01); *H04W 72/085* (2013.01); *H04W 72/1278* (2013.01); *H04L 65/608* (2013.01)

(58) Field of Classification Search
CPC ........... H04W 72/048; H04W 72/0493; H04W 72/0486; H04W 72/06; H04W 72/10; H04W 4/046
USPC ....... 455/450, 451, 452.1, 422.1, 550.1, 561
See application file for complete search history.

(56) References Cited

U.S. PATENT DOCUMENTS

| 7,983,841 | B2 | 7/2011 | Laberteaux et al. |
| 8,290,426 | B2 | 10/2012 | Altintas |
| 8,483,700 | B2 | 7/2013 | Kim et al. |
| 8,750,907 | B2* | 6/2014 | Won ............... H04W 4/02 455/456.1 |
| 8,781,500 | B1 | 7/2014 | Dekel |
| 8,874,123 | B1 | 10/2014 | Sigg et al. |
| 9,955,287 | B2* | 4/2018 | Murayama ............ H04W 4/80 |
| 2005/0232292 | A1 | 10/2005 | Richards et al. |
| 2006/0262761 | A1 | 11/2006 | Tsunekawa et al. |
| 2008/0261620 | A1* | 10/2008 | Rekimoto ............ H04W 64/00 455/456.1 |
| 2009/0172118 | A1* | 7/2009 | Lee ................... H04L 51/14 709/206 |
| 2009/0179736 | A1 | 7/2009 | Shiraishi et al. |
| 2010/0029263 | A1* | 2/2010 | Senoo ................. H04W 48/18 455/423 |
| 2010/0173632 | A1 | 7/2010 | Kitaji |
| 2010/0323694 | A1 | 12/2010 | Altintas |
| 2012/0134336 | A1 | 5/2012 | Nakaya et al. |
| 2012/0214529 | A1 | 8/2012 | Ohta et al. |
| 2012/0295612 | A1 | 11/2012 | Yokoyama |
| 2012/0309400 | A1 | 12/2012 | Inumaru |
| 2014/0180574 | A1* | 6/2014 | Lee ................... H04W 4/21 701/420 |
| 2015/0172857 | A1* | 6/2015 | Mae ................... H04W 76/14 455/39 |
| 2016/0057639 | A1 | 2/2016 | Smith |
| 2016/0078651 | A1 | 3/2016 | Asher |
| 2016/0100393 | A1 | 4/2016 | Takashima et al. |
| 2016/0132933 | A1* | 5/2016 | Kunihiro ............. H04W 4/02 705/14.58 |
| 2016/0183121 | A1* | 6/2016 | Kazmi ................. H04W 28/18 370/230 |
| 2016/0334228 | A1* | 11/2016 | Wang .................. G01C 21/3641 |
| 2017/0188335 | A1 | 6/2017 | Uchino et al. |

FOREIGN PATENT DOCUMENTS

| EP | 3018923 A1 | 5/2016 |
| JP | 2009200773 A | 9/2009 |
| WO | 2013/152808 A1 | 10/2013 |

OTHER PUBLICATIONS

Ignaciuk, P. et al., "Congestion Control in Data Transmission Networks: Sliding Mode and Other Designs—Przemyslaw Ignaciuk, Andrzej Bartoszewicz—Google Books.",XP055379885, (2013).

\* cited by examiner

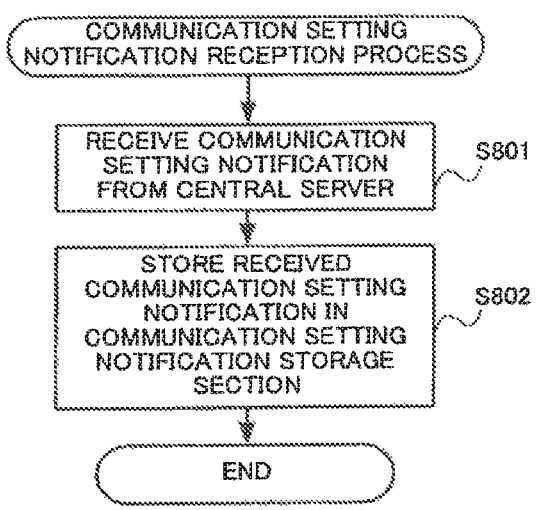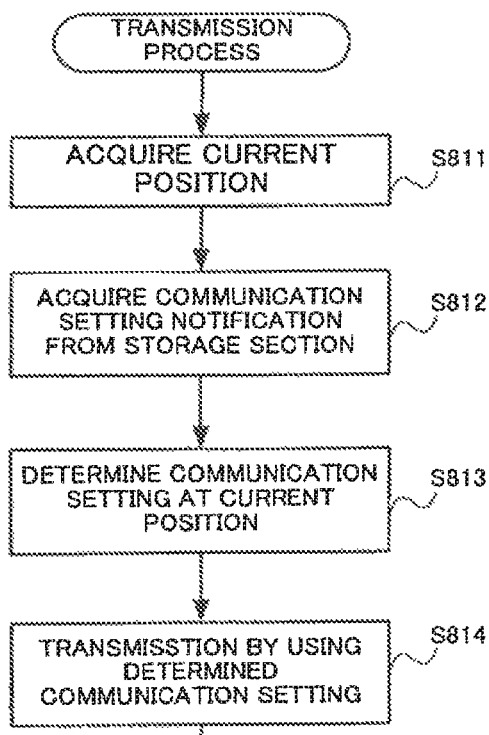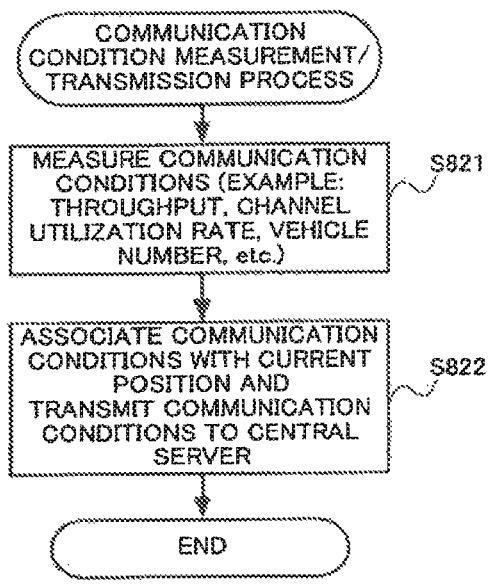

RF RESOURCE ALLOCATION DEVICE AND METHOD, AND RADIO COMMUNICATION SYSTEM

This is a Continuation of application Ser. No. 15/429,522 filed Feb. 10, 2017. The entire disclosures of the prior applications are hereby incorporated by reference herein their entirety.

BACKGROUND OF THE INVENTION

Field of the Invention

The present invention relates to an RF resource allocation technique, and particularly relates to an RF resource allocation technique by which an RF resource allocation device notifies a mobile terminal of an RF resource to be used.

Description of the Related Art

In recent years, a mobile terminal (movable radio communication device) is equipped for a plurality of radio frequencies and radio communication methods, and increases the efficiency of communication and avoids congestion by performing the communication by using an appropriate communication parameter in accordance with conditions. A method for determining the communication parameter includes a distribution method in which the mobile terminal itself determines the communication parameter and a central control method in which a central server determines the communication parameter and notifies the mobile terminal of the determined communication parameter.

Each of Japanese Patent Application Laid-open No. 2009-200773 and U.S. Pat. No. 8,290,426 discloses a method for determining a frequency to be used by the distribution method. In this method, the mobile terminal detects an available frequency by scanning. At this point, the mobile terminal refers to a table in which the utilization probability of each frequency is indicated for each time and position, and an increase in efficiency is achieved by scanning the frequencies in descending order of the utilization probability.

One of the problems of the distribution method is that the mobile terminal cannot recognize global communication conditions. There are cases where a lack of a global viewpoint leads to the hidden node problem. In addition, when a plurality of the mobile terminals perform the scanning independently of each other, there are cases where the mobile terminals simultaneously start transmission by using the same channel, which leads to the loss of messages of both terminals. As the utilization rate of the channel is higher, the problem gets more severe.

The central control method is used in a mobile phone network and the like. A system that uses a white space database (WSDB) (Google Inc. "Proposal by Google Inc. to Provide a TV Band Device Database Management Solution", [online], [retrieved on Mar. 3, 2016], <URL: http://www.scribd.com/doc/24784912/01-04-10-Google-White-Space s-Database-Proposal>) is one of the central control methods. In the mobile phone network, the mobile terminal and a base station need to cooperate with each other closely and communicate with each other bidirectionally. In the case of WSDB, white space information is distributed by broadcast, and it is not necessary to transmit data from the mobile terminal to WSDB. However, in the system that uses WSDB, static white space information based on the position of a broadcast station is sent, and it is difficult to control the communication parameter in accordance with the real-time communication conditions.

Patent Document 1: Japanese Patent Application Laid-open No. 2009-200773
Patent Document 2: U.S. Pat. No. 8,290,426
Patent Document 3: U.S. Pat. No. 7,983,841
Patent Document 4: U.S. Pat. No. 8,483,700
Patent Document 5: U.S. Pat. No. 8,874,123
Patent Document 6: U.S. Pat. No. 6,965,576
Non-Patent Document 1: Google Inc. "Proposal by Google Inc. to Provide a TV Band Device Database Management Solution", [online], [retrieved on Mar. 3, 2016], <URL: http://www.scribd.com/doc/24784912/01-04-10-Google-White-Space s-Database-Proposal>

SUMMARY OF THE INVENTION

An object of the present invention is to provide an RF resource allocation method capable of considering the communication conditions in real time and improving the communication efficiency of the entire system with a simple configuration, and a radio communication method that uses the RF resource allocation method.

A first aspect of the present invention is an RF resource allocation device that distributes to a mobile terminal a communication setting notification including a communication setting to be used in a radio communication. The RF resource allocation device according to the present aspect includes an acquisition unit configured to acquire a measurement result or an estimation result of communication conditions at a plurality of positions, a generation unit configured to determine for each region the communication setting to be used by the mobile terminal in the radio communication based on the communication conditions, and generate the communication setting notification including the communication setting for each region, and a transmission unit configured to transmit the communication setting notification to the mobile terminal, and the acquisition of the communication conditions by the acquisition unit and the generation of the communication setting notification by the generation unit are executed repeatedly at predetermined time intervals.

The communication conditions described above mean the conditions that influence the radio communication by the mobile terminal. Examples of the communication conditions include communication performance of each communication setting and a utilization rate of a channel. The communication performance can be represented by, e.g., a throughput, a bit error rate (BER), a packet error rate (PER), and a signal to interference plus noise ratio (SINR). Another example of the communication conditions includes the number of the mobile terminals or the density thereof.

In the present invention, the acquisition unit can acquire the actual measured value of the communication conditions. The communication conditions may be measured by the mobile terminal, or may also be measured by a measurement device other than the mobile terminal. The acquisition unit may also acquire the estimated value of the communication conditions. The communication performance can be measured based on the actual communication. The number of the mobile terminals or the density thereof is obtained by acquiring position information of the mobile terminal or measuring a traffic flow. The acquisition unit has, e.g., historical data of the previous communication conditions, and can estimate the current communication conditions at each position based on the historical data. In addition, the acquisition unit may acquire both of the actual measured value and the estimated value of the communication conditions. For example, the acquisition unit may use the actual measured value at a position where the actual measured value can be acquired, and may use the estimated value at a position where the actual measured value cannot be acquired. Alternatively, the acquisition unit may estimate the communication conditions during a predetermined time period from the present by using the actual measured value and/or the historical data.

In the present invention, the generation unit determines, for each region, the communication setting to be used of at least one of the communication settings (communication parameters) that can be used by the mobile terminal. Examples of the communication setting include a communication method, a media access method, a modulation method, a frequency to be used, a maximum transmission rate, a maximum transmission size, and a transmission output. The communication setting notification may provide a notification that one predetermined value or setting is used for one communication setting, or may also provide a notification that any of a plurality of values or settings can be used. The generation unit determines the communication setting to be used for each region, but the communication setting to be used may not be particularly limited for part of the regions. In the region in which the communication setting is not limited, the mobile terminal can perform the communication by using any communication setting.

The generation unit can determine the communication setting such that communication congestion does not occur in the region when the generation unit determines the communication setting of each region. For example, the generation unit can determine the communication setting such that an area (region) in which the same communication setting is used is narrowed. With this, a region in which collision of the communication can occur (collision domain) can be separated. By making the collision domain smaller as a communication volume is larger, it is possible to avoid the collision more reliably. The generation unit preferably allocates many resources to a region that has many resource requests such as a crowded intersection. In addition, the generation unit preferably determines the communication setting so as to support a handover in consideration of the position of an infrastructure such as a roadside unit.

In the present invention, as long as the transmission unit can distribute the communication setting notification to the mobile terminal, the transmission method of the communication setting notification is not particularly limited. The transmission unit can transmit the communication setting notification to the mobile terminal with, e.g., a channel dedicated to the communication setting notification. In addition, in the present invention, the transmission unit can transmit the communication setting notification by broadcast.

In the present invention, since the RF resource allocation device executes the acquisition of the communication conditions and the generation of the communication setting notification repeatedly at the predetermined time interval, it is possible to generate the communication setting notification based on the new communication conditions. That is, it is possible to generate the communication setting notification that is more appropriate to the current communication conditions, and distribute the communication setting notification to the mobile terminal.

According to the RF resource allocation device according to the present invention, it is possible to determine the communication setting in consideration of the communication conditions of the entire regions, and hence there is obtained an advantageous effect of avoiding the communication congestion to reduce a possibility that the communication fails, improving the throughput of the entire system, or securing fairness among the mobile terminals.

A second aspect of the present invention is a radio communication system including the RF resource allocation device described above, and a mobile terminal. In the radio communication system according to the present aspect, the mobile terminal can include a position information acquisition unit configured to acquire a current position of the mobile terminal, a communication setting notification reception unit configured to receive a communication setting notification from the RF resource allocation device, and a communication control unit configured to perform control such that transmission is performed by using a communication setting to be used at the current position of the mobile terminal included in the communication setting notification.

Note that the present invention can also be viewed as the RF resource allocation device, the mobile terminal, or the radio communication system that includes at least part of the units described above. The present invention can also be viewed as an RF resource allocation method or a radio communication method that executes at least part of the processes described above. The present invention can also be viewed as a computer program for causing a computer to execute the method or a computer readable storage medium in which the computer program is stored non-transitorily. The present invention can be constituted by combining the individual units and processes described above as much as possible.

According to the present invention, it is possible to consider the communication conditions in real time and improve the communication efficiency of the entire system with the simple configuration.

BRIEF DESCRIPTION OF THE DRAWINGS

FIGS. 8A to 8C are flowcharts showing the flows of processes performed by the radio communication device provided in the vehicle.

DESCRIPTION OF THE EMBODIMENTS

Hereinbelow, with reference to the drawings, a preferred embodiment of the invention will be illustratively described in detail. The embodiment described below is a system in which the present invention is applied to a vehicle network, but the application of the present invention is not limited to the vehicle network, and the present invention can be applied to any mobile radio communication network.

System Outline

Figure 1:
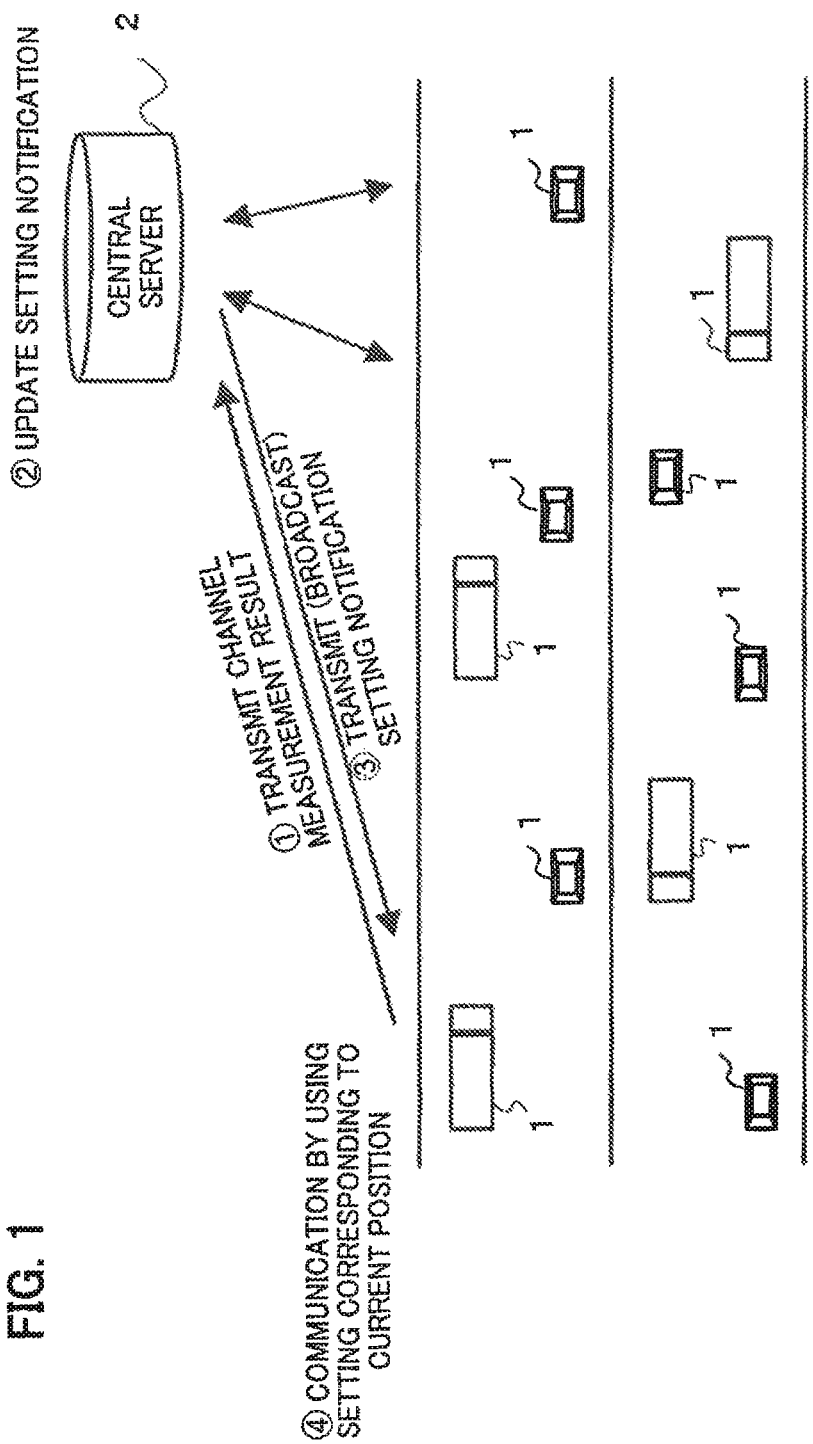
FIG. 1 is a view showing the outline of a radiocommunication system according to an embodiment.

FIG. 1 is a view showing the outline of the radio communication system according to the present embodiment. The present radio communication system is constituted by a plurality of vehicles 1 and a central server 2. Each vehicle 1 can communicate with the central server 2 bidirectionally. Each vehicle 1 communicates with the central server 2 via communication equipment (access point) provided on the roadside. The central server 2 may be constituted by a single computer, or may also be constituted by a plurality of computers that are distributed and disposed. A communication unit between the vehicle 1 and the central server 2 is not limited to the communication equipment on the roadside, and the communication unit may be any communication unit such as a mobile phone network or a satellite communication network.

Each vehicle 1 in the present radio communication system has a plurality of radio interfaces, and performs radio communication with other vehicles 1 or other devices by using appropriate radio communication settings in accordance with conditions. In the present embodiment, the vehicle 1 receives a communication setting notification (also referred to as an advisory (advice)) from the central server 2, and determines a communication setting (the radio interface (communication method), a media access method, a modulation method, a frequency to be used, a maximum transmission rate, a maximum transmission size, a transmission output, or the like) that is used in the radio communication by referring to the communication setting notification. Although described later in detail, the communication setting notification is generated in the central server 2 based on the result of measurement of channel conditions (communication conditions) reported from the vehicles, and the communication setting to be used is stored for each region. The vehicle 1 measures its current position, and uses the communication setting corresponding to the current position.

Vehicle

Figure 2:
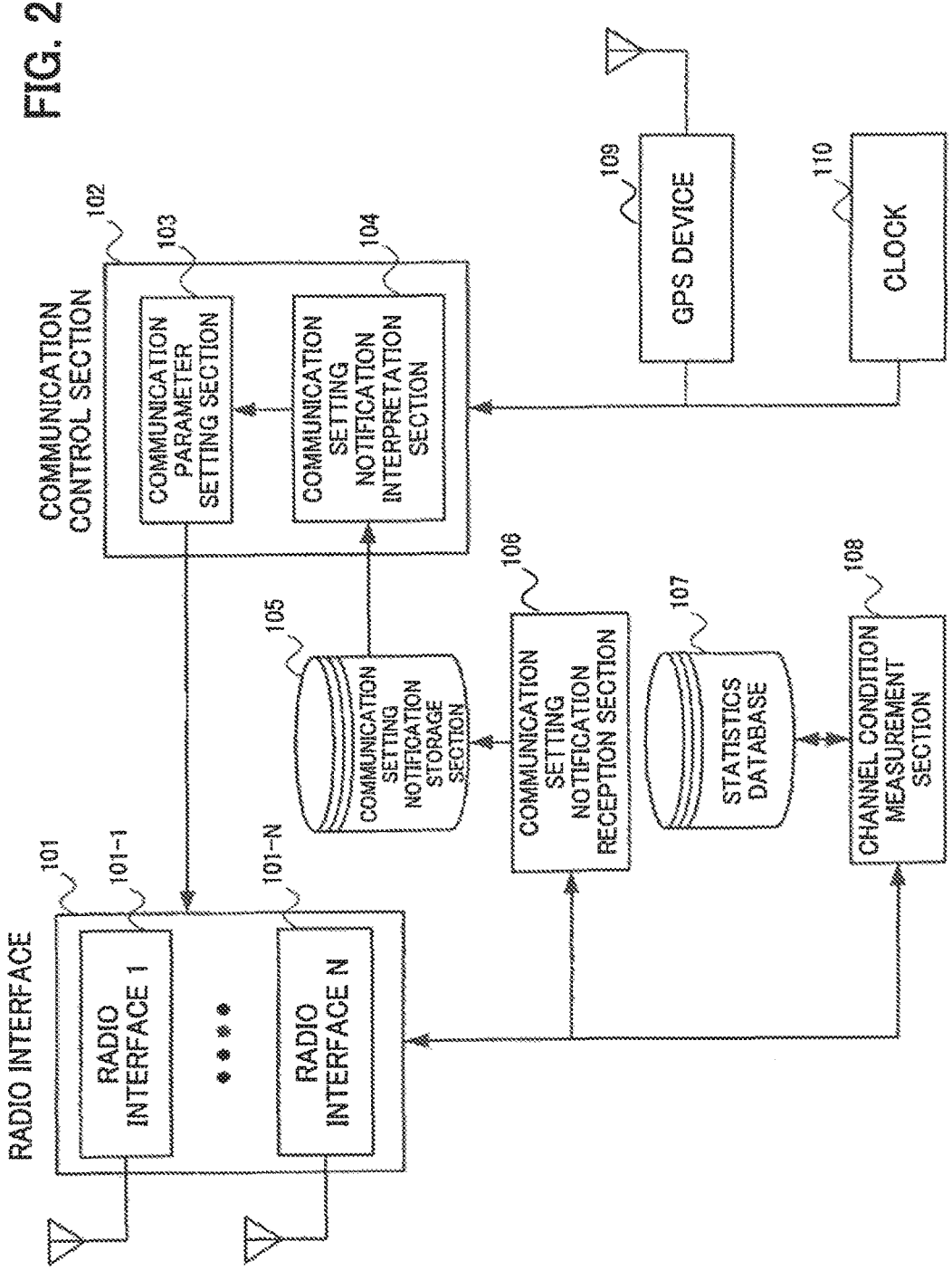
FIG. 2 is a view showing the configuration of a radio communication device provided in a vehicle.

FIG. 2 is a view showing the configuration of a radio communication device provided in the vehicle 1. Note that, in the following description, the vehicle 1 is not distinguished from the radio communication device provided in the vehicle 1, and the radio communication device provided in the vehicle 1 is referred to as the vehicle 1 in some cases. The vehicle 1 includes a plurality of radio interfaces 101_1 to 101_N (hereinafter collectively referred to as a radio interface 101 in some cases), a communication control section 102, a communication setting notification storage section 105, a communication setting notification reception section 106, a statistics database 107, a channel condition measurement section 108, a GPS device 109, and a clock 110. The communication control section 102 includes a communication parameter setting section 103 and a communication setting notification interpretation section 104. The communication control section 102 is constituted by a logic circuit such as a field programmable gate array (FPGA) or an application specific integrated circuit (ASIC), but part or all of functions may also be implemented by a central processing unit (CPU) and a program.

Examples of the radio interface 101 include Wi-Fi, long term evolution (LTE), and dedicated short range communication (DSRC). The vehicle 1 is capable of transmission and reception of data by using the plurality of radio interfaces 101. In the present embodiment, the vehicle 1 performs the transmission by using one of the radio interfaces 101, and performs the reception by using the plurality of radio interfaces 101. As the radio interface 101, an interface dedicated to the reception such as a One-Seg tuner or an FM radio receiver may also be provided.

The communication setting notification reception section 106 receives the communication setting notification (advisory) from the central server 2. In the present embodiment, as will be described later, the communication setting notification is broadcast from the central server 2 by using a communication channel dedicated to road-to-vehicle communication (V2I communication). When the communication setting notification reception section 106 receives the communication setting notification, the communication setting notification reception section 106 stores the content thereof in the communication setting notification storage section 105.

The communication setting notification interpretation section 104 acquires the latest communication setting from the communication setting notification storage section 105, or acquires the current position of the vehicle 1 from the GPS device 109. As will be described later, in the communication setting notification, the communication setting to be used by the vehicle 1 for the radio communication is stored for each region (geographic position). The communication setting notification interpretation section 104 determines the communication setting to be used that is set at the current position of the vehicle 1. The communication setting determined by the communication setting notification interpretation section 104 includes at least part of the radio interface to be used (communication method), the media access method, the modulation method, the frequency to be used, the maximum transmission rate, the maximum transmission size, and the transmission output.

The communication setting notification does not specify all of the communication settings to be used in the radio communication, and there are cases where the use of any of a plurality of communication settings is permitted, or there is no restriction put on the communication setting depending on the region. In the case where there are a plurality of usable communication settings, the communication setting notification interpretation section 104 determines the appropriate communication setting from among the plurality of the communication settings. The communication setting determined by the communication setting notification interpretation section 104 is sent to the communication parameter setting section 103.

The communication parameter setting section 103 instructs the radio interface 101 to perform the communication with the communication setting sent from the communication setting notification interpretation section 104. Note that, in the case where there are a plurality of the usable communication settings in the communication setting notification, the communication parameter setting section 103 may determine the appropriate communication setting from among the plurality of the communication settings.

The Global Positioning System (GPS) device 109 acquires the current position based on a signal transmitted from a GPS satellite. As the GPS device 109, Differential GPS (DGPS) in which a position error is corrected based on a radio wave transmitted by a reference station may be used. In addition, as long as position information can be acquired, a global navigation satellite system (GNSS) other than GPS may be used, or base station positioning may also be used.

The channel condition measurement section 108 measures the conditions of the radio communication channel around the vehicle 1. The channel condition measurement section 108 measures, e.g., communication performance in the radio communication channel that is currently used (a throughput, a bit error rate, and a packet error rate) and a channel utilization rate. The measurement result is stored in the statistics database 107 together with the time and date of the measurement and the measurement position. The channel condition measurement section 108 transmits the measurement result of the channel conditions or historical data of the measurement result that is stored in the statistics database 107 to the central server 2 via the radio interface 101 at an appropriate timing.

Note that only the current position of the vehicle 1 obtained from the GPS device 109 may be transmitted to the central server 2 without providing the channel condition measurement section 108. The central server 2 can grasp the number of vehicles at each position or the density thereof by acquiring the position of the vehicle 1.

The clock 110 is a system clock, and each functional section of the radio communication device operates in synchronization with the clock 110.

Central Server

Figure 3:
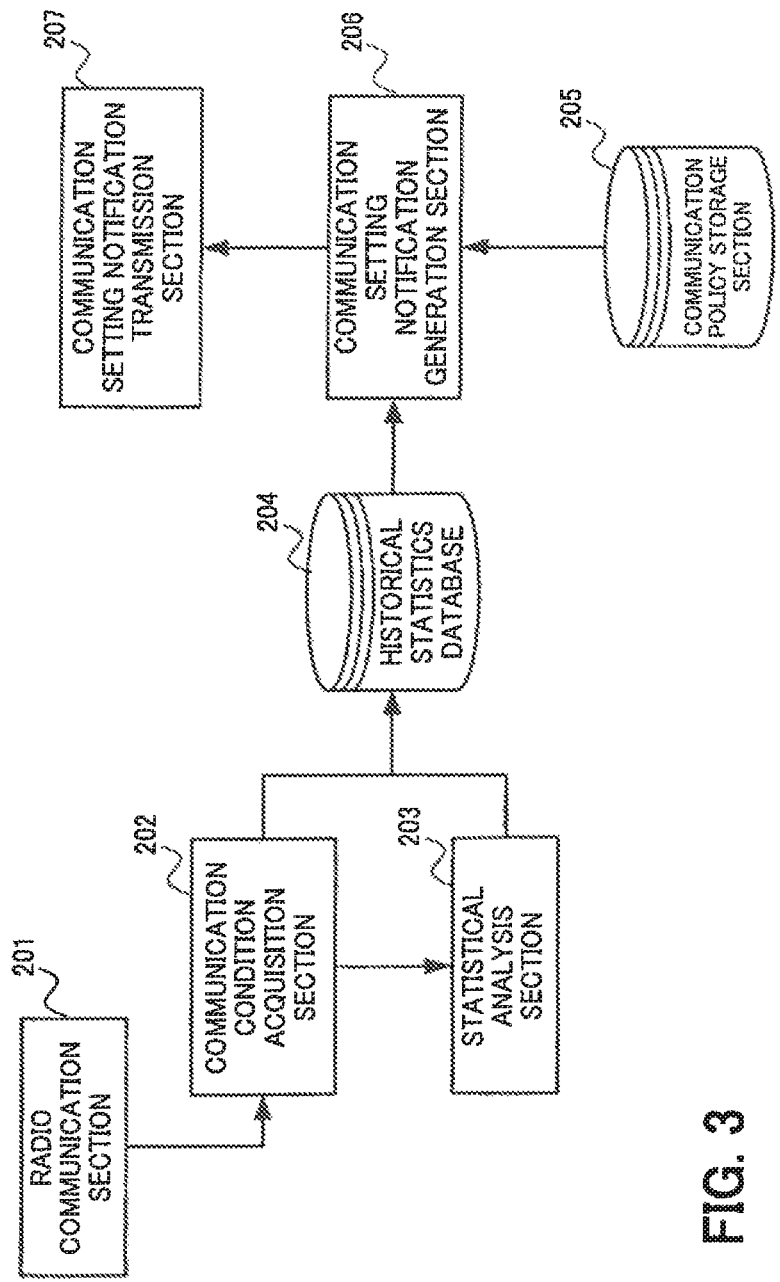
FIG. 3 is a view showing the configuration of a central server (RF resource allocation device)

FIG. 3 is a view showing the functional configuration of the central server 2. The central server 2 has a function of allocating the RF resource to the vehicle 1, and hence the central server 2 can be interpreted as an RF resource allocation device. The central server 2 includes a radio communication section 201, a communication condition acquisition section 202, a statistical analysis section 203, a historical statistics database 204, a policy storage section 205, a communication setting notification generation section 206, and a communication setting notification transmission section 207. The individual functions of the central server 2 are implemented by a central processing unit (CPU) and a program, but part or all of the functions thereof may be implemented by the logic circuit such as the field programmable gate array (FPGA) or the application specific integrated circuit (ASIC).

The radio communication section 201 performs the communication with the vehicle 1 and other devices. The communication method is not particularly limited, and the central server 2 performs the communication by using, e.g., the communication channel dedicated to the road-to-vehicle communication (V2I communication). The central server 2 may also perform the communication with a measurement device that measures the number of vehicles on a road (or the vehicle density) and the radio communication conditions in addition to the vehicle 1.

The communication condition acquisition section 202 acquires the communication conditions measured by the vehicle 1 and other measurement devices. The communication conditions include the conditions of the radio communication channel, i.e., the communication performance in the radio communication channel (the throughput, the bit error rate, and the packet error rate) and the channel utilization rate. In addition, the communication conditions include the number of vehicles on the road and the vehicle density.

The statistical analysis section 203 statistically analyzes the measurement result of the communication conditions acquired by the communication condition acquisition section 202. The statistical analysis section 203 determines, e.g., the mean value or the variance value of the communication conditions at each position (region) and in each time zone.

The historical statistics database 204 stores the measurement result of the communication conditions received by the communication condition acquisition section 202 and the analysis result by the statistical analysis section 203.

The policy storage section 205 stores a policy applied to the radio communication by the vehicle 1. The communication policy may represent a restriction on the radio communication imposed by the government or the authorities. Alternatively, the communication policy may also be a requirement on the radio communication imposed by a manager of the radio communication system. The central server 2 determines the allocation of the RF resource such that efficiency of the radio communication among the vehicles is increased while obeying the policies.

The communication setting notification generation section 206 determines the communication setting to be used by the vehicle 1 in the radio communication for each region based on the communication conditions stored in the historical statistics database 204, and generates the communication setting notification that includes the communication setting to be used by the vehicle 1 for each region. The communication setting notification generation section 206 typically determines the communication setting such that communication congestion does not occur in the region. The communication setting notification generation section 206 determines the communication setting such that an area (region) in which the same communication setting is used is narrowed. In particular, the communication setting notification generation section 206 makes the area in which the same communication setting is used narrower as a communication volume in the area is larger. An example of the specific method for determining the communication setting will be described later.

The communication setting notification generation section 206 can generate the communication setting notification based on the statistical analysis result based on the historical data of the communication conditions. That is, the communication setting notification can be generated based on the current communication conditions estimated from the previous communication conditions. Alternatively, the communication setting notification generation section 206 can generate the communication setting notification based on the latest measurement result of the communication conditions acquired from the vehicle 1 and other measurement devices. The use of the latest measurement result (within a predetermined time) allows the generation of the communication setting notification based on the current communication conditions. It becomes possible to perform more appropriate RF resource allocation by using the current communication conditions, and hence the communication setting notification generation section 206 according to the present embodiment generates the communication setting notification by using the measurement result and the previous historical data at a position where the latest measurement result can be used, and generates the communication setting notification by using the previous historical data at a position where the measurement result cannot be used.

The communication setting notification includes the communication setting to be used for each region. The size and shape of the region can be appropriately determined. For example, the region can be set to a mesh with sides of 50 meters.

In the communication setting notification, all of the communication settings (parameters) may be specified, or only part of the communication settings may also be specified. In the case where all of the communication settings are specified in the communication setting notification, the vehicle 1 performs the communication according to the settings in the communication setting notification. In the case where only part of the communication settings is specified in the communication setting notification, the vehicle 1 can independently determine the communication setting that is not specified. In addition, the communication setting notification may include a plurality of the communication settings for one region. In this case, the vehicle 1 performs the radio communication by using any of the communication settings included in the communication setting notification. In the communication setting notification, the communication setting may not be specified for a given region. In this case, the vehicle 1 can independently determine the communication setting.

The communication setting notification generation section 206 generates the communication setting notification repeatedly at predetermined time intervals. The predetermined time interval can be set to a time interval that is determined in advance such as 10 seconds, 1 minute, 2 minutes, 10 minutes, 15 minutes, 30 minutes, or 1 hour. The time interval can be appropriately set in accordance with a request made to the system by the manager of the radio communication system.

Figure 4:
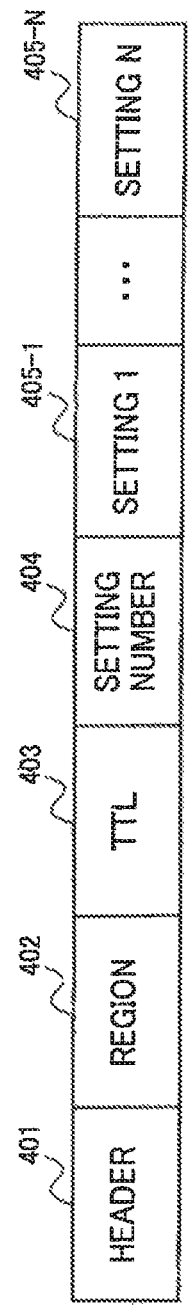
FIG. 4 is a view showing a format of one record of a communication setting notification.

FIG. 4 is a view showing the format of one record of the communication setting notification generated by the communication setting notification generation section 206. The communication setting notification is configured by including a plurality of the records each having the format shown in FIG. 4. One record of the communication setting notification includes a header 401, a region 402, a time-to-live (TTL) 403, a setting number 404, and settings 1 to N (405-1 to 405-N). The header 401 includes an identifier indicating that the data is the communication setting notification, and an identifier indicative of a sender. The region 402 indicates the geographic area serving as the target of the record. The region may be identified by an identifier of the region, or may also be identified by position coordinates of the apexes or the center of the region. The TTL 403 indicates a time period in which the communication setting of the record is valid. The setting number 404 indicates the number (N) of the communication settings included in the record. The settings 1 to N (405-1 to 405-N) identify the communication parameters to be used. In individual fields of the settings 1 to N (405-1 to 405-N), the parameters to be used for the communication method, the media access method, the modulation method, the frequency to be used, the maximum transmission rate, the maximum transmission size, the transmission output, or the like, are stored.

In the case where a plurality of the communication settings can be used in a given region, a plurality of the records may be defined for the same region 402. In addition, in the case where the communication setting to be used is not particularly limited in a given region, the communication setting notification preferably includes the record indicating that the communication setting is not limited in the region.

The method for determining the communication setting by the communication setting notification generation section 206, i.e., a resource allocation method will be described in greater detail. As the resource allocation method, the following three methods are conceivable.

The first method is a method in which, in order to separate the terminals that use the same resource, a region in which the same resource is used is limited, and different resources are used in adjacent regions. For example, it is conceivable to allocate the radio frequency or the radio communication method that differs from one region to another. With this, it is possible to limit the region in which collision of the radio communication can occur (collision domain).

The second method is a method in which a plurality of the resources are allocated to a region that has many resource requests (large communication volume). For example, it is conceivable to allocate a plurality of the radio frequencies or a plurality of the radio communication methods to a region in the vicinity of an intersection on a main road where a traffic jam occurs. Thus, in the region to which a plurality of the resources are allocated, the vehicle 1 may appropriately perform the communication by using any of the resources.

The third method is a method in which the resource is allocated so as to support handover decisions with attention paid to an installation position of an infrastructure facility such as a roadside unit. For example, around the region in which the communication with the roadside unit is allowed, it is conceivable to allocate the communication method that facilitates the handover to the communication with the roadside unit.

Figure 5:
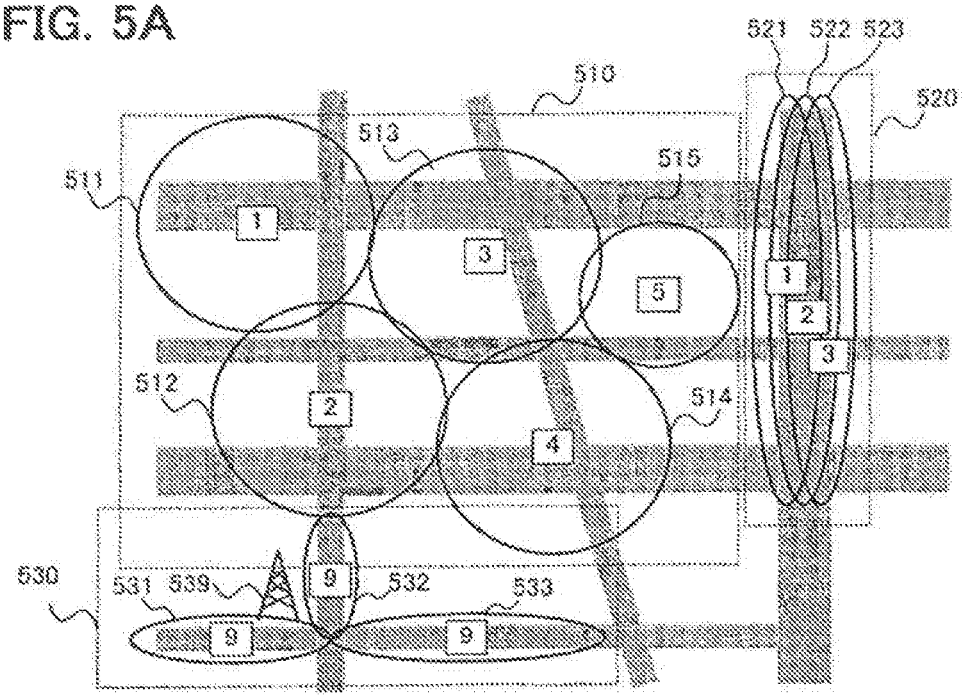
FIGS. 5A and 5B are views for explaining the outline of an RF resource allocation method.

FIGS. 5A and 5B are views for explaining the outline of the RF resource allocation method (the method for determining the communication setting) by the communication setting notification generation section 206. FIG. 5A conceptually shows the resource allocation at each position, and FIG. 5B shows an example in which the allocation method shown in FIG. 5A is applied by the communication setting notification according to the present embodiment. Note that each square in FIG. 5B represents the region, and the number in the square denotes the RF resource allocated to the region (herein, the description will be made on the assumption that the 9 communication settings "1" to "9" are provided for the sake of simplification). Note that examples shown in FIGS. 5A and 5B are for the purpose of description, and such an allocation does not need to be performed actually.

In a portion surrounded by a dotted line 510 in FIG. 5A, the allocation by the first method described above is performed. That is, resources "1" to "5" (e.g., frequencies "1" to "5") are allocated to regions 511 to 515. The vehicle 1 performs the communication by using the resources allocated to the individual regions, and hence the number of the vehicles 1 that use the same resource is limited. With this, the communication volume is decreased and the collision of the communication is reduced, and hence it becomes possible to perform the communication efficiently.

In a portion surrounded by a dotted line 520 in FIG. 5A, the allocation by the second method described above is performed. In FIG. 5A, although three regions 521 to 523 are shown, they actually belong to the same region, and three types of resources "1" to "3" are allocated to this region. The vehicle 1 positioned in the region may use any of the resources "1" to "3". Thus, by allocating a plurality of the resources to the region having the large communication volume, it becomes possible to cope with the large communication volume.

In a portion surrounded by a dotted line 530 in FIG. 5A, the allocation by the third method described above is performed. In regions 531 to 533 in which the communication with a roadside unit 539 is allowed, in consideration of the handover to the roadside unit 539, a resource "9" that can be used in the communication with the roadside unit 539 is allocated. With this, while the vehicle 1 in an area in which the communication with the roadside unit 539 is allowed can communicate with the roadside unit 539, the distant vehicle 1 that a signal from the roadside unit 539 can scarcely reach can perform the communication by using the other resources.

Note that, in the case where, at a given position, the communication volume is increased, or the number of vehicles or the vehicle density is increased, it is preferable to reduce the size of the region to which the same resource is applied or reduce the upper limit of the maximum communication speed or the maximum transmission size in the region. With this, it is possible to reduce the communication volume in the region to avoid the collision of the communication.

The communication setting notification transmission section 207 transmits the communication setting notification generated by the communication setting notification generation section 206 to the vehicle 1. In the present embodiment, the communication setting notification transmission section 207 transmits (distributes) the communication setting notification to the vehicle 1 via broadcast by using the communication channel dedicated to the road-to-vehicle communication. In the present embodiment, bidirectional communication with the central server 2 is not necessary when the vehicle 1 determines the communication setting, and hence the transmission by broadcast is adequate. Note that the communication setting notification may also be broadcast by a method that uses conventional infrastructures or a method that uses satellite broadcast or digital terrestrial broadcasting (DVB-T or the like) other than the road-to-vehicle communication.

Note that, in the case where the size of the communication setting notification is large, the communication setting notification transmission section 207 does not need to transmit the entire communication setting notification with one transmission, and the communication setting notification may be divided into appropriate units and the units may be individually transmitted. The frequency of the transmission by the communication setting notification transmission section 207 can be set to once or a plurality of times every time the communication setting notification is newly generated. Typically, it is preferable to repeat the transmission at an interval shorter than an interval of update of the communication setting notification.

Method

Next, processes performed by the central server 2 and the vehicle 1 in the radio communication system according to the present embodiment will be described with reference to flowcharts.

Figure 6:
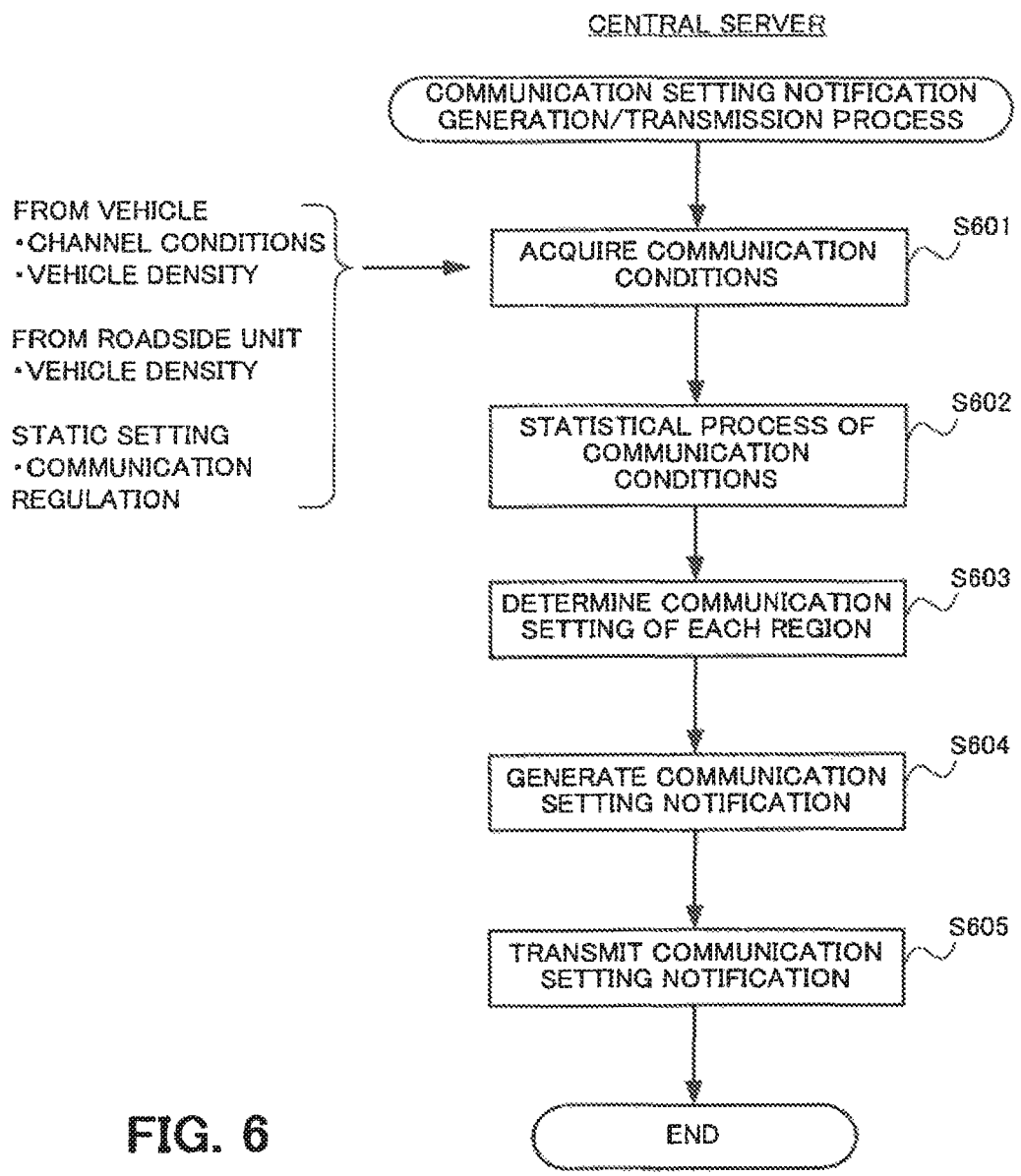
FIG. 6 is a flowchart showing the flow of a process performed by the central server.

With reference to a flowchart in FIG. 6, a process performed by the central server 2 will be described. The process shown in FIG. 6 is repeatedly executed periodically.

In Step S601, the communication condition acquisition section 202 acquires the measurement result of the communication conditions from, for instance, the vehicle 1 and the roadside unit. The acquired communication conditions include the conditions of the channel such as the communication performance and the channel utilization rate and the density of the vehicle.

In Step S602, the statistical analysis section 203 executes a statistical analysis process on the acquired communication conditions, and determines the communication conditions at each position and each time.

In Step S603, the communication setting notification generation section 206 determines the communication setting at each position based on the communication conditions. In addition, the communication setting notification generation section 206 acquires or estimates the current communication conditions from the real-time communication conditions acquired from the vehicle 1 or the measurement device and the statistical communication conditions obtained by the statistical analysis section 203, and executes the allocation of the appropriate communication setting such that the congestion does not occur. In Step S604, the communication setting notification generation section 206 generates the communication setting notification based on the allocation of the determined communication setting.

In Step S605, the communication setting notification transmission section 207 transmits the generated communication setting notification to the vehicle 1 by broadcast with the channel dedicated to the road-to-vehicle communication. The transmission of the communication setting notification may be performed only once, or may also be executed repeatedly.

Figure 7:
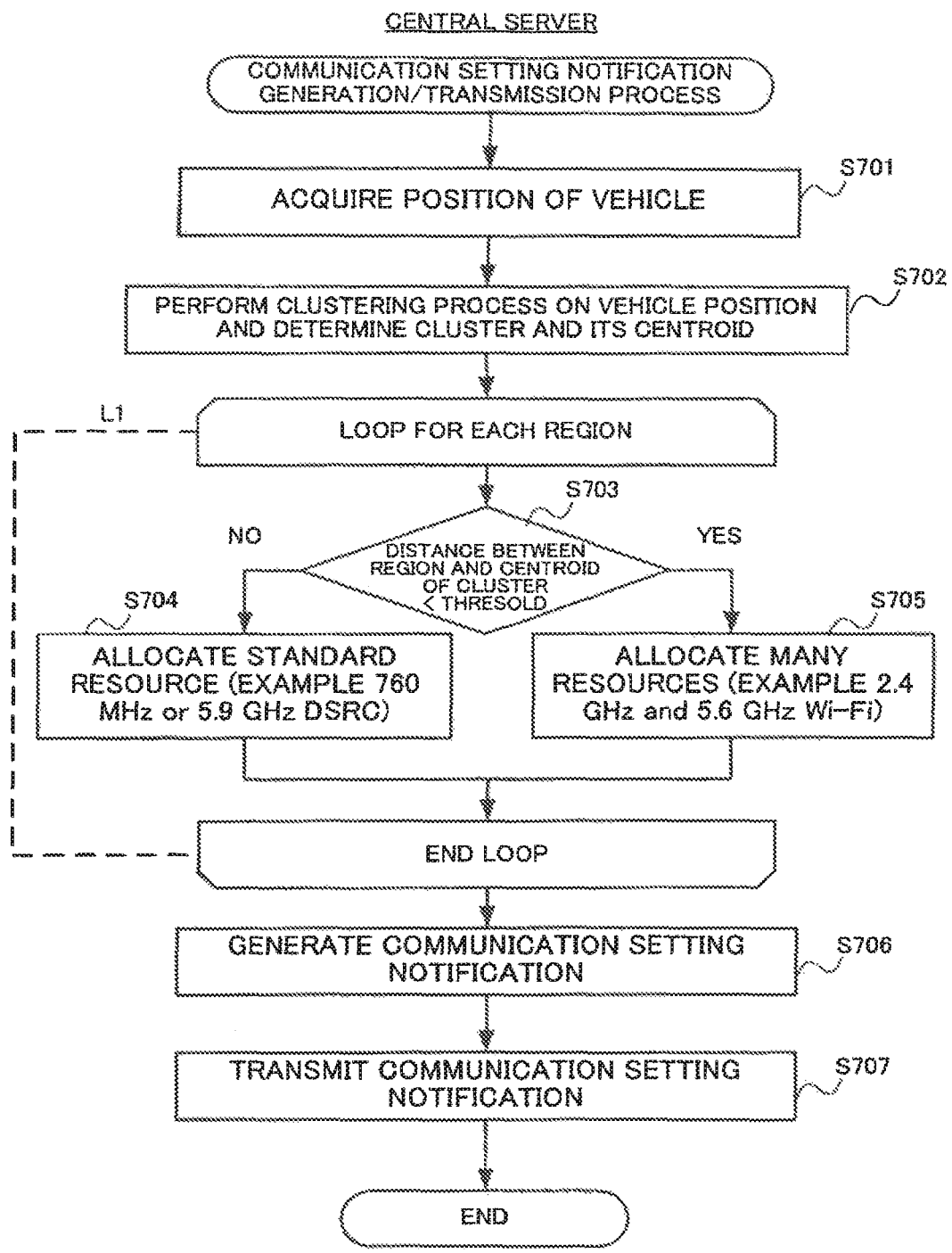
FIG. 7 is a flowchart showing a specific example of a generation process of the communication setting notification performed by the central server.

With reference to a flowchart in FIG. 7, the generation process of the communication setting notification will be described more specifically. The process shown in FIG. 7 is one specific example of the communication setting notification generation. Herein, for the sake of simplification of description, only the density of the vehicle is considered as the communication conditions, and only the radio communication method (760 MHz DSRC, 5.9 GHz DSRC, 2.4 GHz Wi-Fi, 5.6 GHz Wi-Fi) to be used is considered as the available communication setting.

In Step S701, the communication condition acquisition section 202 acquires the position of the vehicle 1. The acquired vehicle position is not limited to the distribution of the vehicle at a given time, and may also be the distribution in which the vehicle positions at a plurality of times are stacked on each other.

In Step S702, the communication condition acquisition section 202 performs a clustering process on the vehicle position. In the present embodiment, clustering that uses the k-means algorithm (k-means clustering) is performed.

In a loop L1, processes of Steps S703 to S705 are repeated in each region (e.g., a rectangle with sides of 50 m). In Step S703, the communication setting notification generation section 206 determines whether or not a distance between the target region and the centroid of a cluster is not more than a threshold (e.g., 100 meters). The distance between the region and the centroid of the cluster can be defined as, e.g., a distance between the center of the region and the centroid of the cluster. Note that, in Step S703, it is determined whether or not the distance between the target region and the centroid of, among a plurality of the clusters, the cluster closest to the target region is not more than the threshold.

In the case where the distance between the target region and the centroid of the cluster closest to the target region is more than the threshold (S703-NO), the communication setting notification generation section 206 allocates a standard resource to the target region. The standard resource allocation can be predetermined and, in the present embodiment, DSRC in a 760 MHz band or DSRC in a 5.9 GHz band is allocated.

On the other hand, in the case where the distance between the target region and the centroid of the cluster closest to the target region is not more than the threshold (S703-YES), the communication setting notification generation section 206 allocates many resources to the target region. The allocation of many resources denotes the allocation of the resources larger in number than the resources of the standard resource allocation and, for example, denotes that the resources are allocated such that the communication having a larger capacity can be performed. This resource allocation can also be predetermined and, in the present embodiment, both of Wi-Fi in a 2.4 GHz band and Wi-Fi in a 5.6 GHz band are allocated. The vehicle 1 in the region can perform the communication by using the 2.4 GHz band or the 5.6 GHz band.

Steps S706 and S707 are the same as Steps S604 and S605 in FIG. 6.

Note that the clustering process in Step S702 is a process for determining the density of the vehicle. Consequently, the algorithm of the clustering does not need to be limited to the k-means clustering. It is possible to adopt a distance-based clustering algorithm and a density-based clustering algorithm other than the k-means clustering. In addition, the determination in Step S703 is a process for determining whether or not the density of the vehicle in the target region is high, and hence the specific determination process may be appropriately changed in accordance with the clustering algorithm.

In addition, the clustering process does not necessarily need to be used in the process for determining the density of the vehicle. For example, in Steps S702 to S703, the number of vehicles present in a predetermined area with the target region positioned at the center may be determined, and the allocation of the resource to the target region may be determined according to whether or not the number of vehicles is not less than a threshold.

With reference to FIGS. 8A to 8C, processes performed by the vehicle 1 will be described.

FIG. 8A is a flowchart showing a process for receiving the communication setting notification from the central server 2. In Step S802, when the communication setting notification reception section 106 receives the communication setting notification from the central server 2, in Step S802, information included in the received setting notification is stored in the communication setting notification storage section 105. With this, the communication setting notification storage section 105 stores the received latest communication setting notification.

FIG. 8B is a flowchart showing a process when the vehicle 1 transmits information to another vehicle. In Step S811, the vehicle 1 acquires the current position from the GPS device 109. In Step S812, the communication control section 102 acquires the content of the communication setting notification stored by the communication setting notification storage section 105. In Step S813, the communication control section 102 acquires the communication setting specified as the communication setting to be used at the current position in the communication setting notification. Note that, in the case where a plurality of the communication settings are specified as those that can be used at the current position, the communication control section 102 may appropriately select the communication setting according to a predetermined selection criterion. In Step S814, the communication control section 102 controls the radio interface 101 such that the communication is performed by using the determined communication setting (communication parameter).

Subsequently to the description of the transmission process of the vehicle 1, a reception process of the vehicle 1 will be described. Similarly to the transmission process, the reception process of the vehicle 1 may be performed only on the communication setting determined from the communication setting notification, but the reception process is preferably performed on all of the communication settings that can be used. This is because only the transmission corresponding to the communication setting notification is not necessarily performed. Alternatively, the reception may also be performed on the communication setting used for the transmission at the current position and in its surrounding region (a region within a predetermined distance).

FIG. 8C is a flowchart showing a process in which the vehicle 1 transmits the communication conditions to the central server 2. In Step S821, the channel condition measurement section 108 measures the channel conditions. Specifically, the channel condition measurement section 108 measures the communication performance such as the throughput, the bit error rate, and the packet error rate and the channel utilization rate. It is also possible to determine the channel utilization rate based on the number of vehicles positioned in the surrounding area and the density thereof. In Step S822, the vehicle 1 transmits the measured channel conditions to the central server 2.

Advantageous Effect of the Present Embodiment

According to the present embodiment, by notifying the vehicle 1 of the allocation of the RF resource from the central server 2, it is possible to improve the quality of the radio communication experienced by the vehicle 1. The central server 2 acquires the information related to the communication conditions from the vehicle 1 and other information sources, and determines the communication setting that allows the improved communication by using the knowledge. The central server 2 determines the allocation of the RF resource for each position, and hence the vehicle 1 can determine the appropriate communication setting based only on the current position of the vehicle 1. That is, the vehicle 1 does not need to communicate with the central server 2 or other vehicles in order to determine the communication setting used for the transmission, and it is possible to suppress overhead for cooperation.

In addition, the central server 2 updates the communication setting notification in accordance with the communication conditions obtained from the vehicle 1 and other information sources, and hence, in the case where the communication congestion has occurred, it is possible to cope with the problem in real time with the instruction from the central server 2.

By performing the radio communication with the appropriate communication setting, it is possible to reduce the frequency of occurrence of the collision of the communication, and improve the throughput and average latency of the communication. At this point, the central server 2 grasps the conditions of the entire system, and hence it is possible to improve not only the throughput of part of the terminals but also the throughput of the entire system. In addition, the central server 2 can allocate the sufficient resources to all of the vehicles and impose appropriate restrictions on each vehicle if necessary, and hence it is possible to achieve fairness of each terminal in the system.

Modification

The above-described embodiment is only an example for implementing the present invention, and the present invention is not limited to the embodiment. The present invention may be variously modified within the scope of the technical concept of the present invention.

The above-described embodiment is the radio communication system constituted by the vehicle (vehicle-mounted terminal), and the present invention can be applied to any radio communication system constituted by a movable radio communication device (mobile terminal). The mobile terminal includes a radio communication device mounted on a mobile device such as the vehicle, and a portable radio communication device.

The communication setting described in the above-described embodiment is only exemplary, and the communication setting notified by the central server (RF resource allocation device) is not limited to the above-described communication setting. Other examples thereof include restrictions on the utilization of the resource of the mobile terminal such as the maximum transmission rate (e.g., X packets or less per second) ora channel quota (maximum transmission size), a combination of frequencies that can be used, a modulation method, a coding method, a transmission output, a media access methods such as time division multiple access (TDMA), (Orthogonal) Frequency Division Multiple Access ((o) FDMA), and spatial division multiple access (SDMA), and access technologies such as Wi-Fi, LTE, and DSRC.

In the above-described embodiment, the allocation of the RF resource is performed by using both of the measured value and the estimated value of the communication conditions. However, it is more preferable to perform the allocation of the RF resource based on the actual measured value without depending on the estimated value of the communication conditions. In order to perform the RF resource allocation based only on the actual measured value, it is important for the central server to receive the measured values of the communication conditions from many vehicles. Further, it is preferable for the central server to receive the measured value of the communication conditions also from the roadside unit. By performing the allocation of the RF resource based on the actual measured value, it is possible to reflect the current conditions more appropriately.

What is claimed is:

1. A radio frequency (RF) resource allocation device that distributes to a mobile terminal a communication setting notification including a communication setting to be used in a radio communication, the RF resource allocation device comprising:
a processor; and
a memory storing a computer program which, when executed by the processor, causes the processor to function as:
an acquisition unit configured to acquire communication conditions at a plurality of positions;
a generation unit configured to determine for each region the communication setting to be used based on the communication conditions, and to generate the communication setting notification including the communication setting for at least one region; and
a transmission unit configured to transmit the communication setting notification.

2. The RF resource allocation device according to claim 1, wherein the acquisition of the communication conditions by the acquisition unit and the generation of the communication setting notification by the generation unit are executed repeatedly at predetermined time intervals.

3. The RF resource allocation device according to claim 1, wherein the communication conditions include communication performance of each communication setting or a utilization rate of a channel.

4. The RF resource allocation device according to claim 1, wherein the communication conditions include a density of the mobile terminal.

5. The RF resource allocation device according to claim 1, wherein the acquisition unit acquires a measurement result of the communication conditions from the mobile terminal or a measurement device that measures the communication conditions.

6. The RF resource allocation device according to claim 1, wherein the acquisition unit estimates the communication conditions, based on historical data of the communication conditions for respective positions.

7. The RF resource allocation device according to claim 1, wherein the generation unit determines the communication setting for each region such that communication congestion does not occur.

8. The RF resource allocation device according to claim 1, wherein the generation unit determines, for each region, the communication setting to be used for at least any of a communication method, a media access method, a modulation method, a frequency to be used, a maximum transmission rate, a maximum transmission size, and a transmission output.

9. The RF resource allocation device according to claim 1, wherein the transmission unit transmits the communication setting notification by broadcast.

10. A radio communication system comprising:
the RF resource allocation device according to claim 1; and
a mobile terminal,
wherein the mobile terminal includes:
a processor; and
a memory storing a computer program which, when executed by the processor, causes the processor to function as:
a position information acquisition unit configured to acquire a current position of the mobile terminal;
a communication setting notification reception unit configured to receive a communication setting notification from the RF resource allocation device; and
a communication control unit configured to perform control such that transmission is performed by using a communication setting to be used at the current position of the mobile terminal included in the communication setting notification.

11. The radio communication system according to claim 10,
wherein the computer program of the mobile terminal further causes the processor of the mobile terminal to function as a storage unit configured to store the communication setting notification received by the communication setting notification reception unit, and
wherein the communication control unit determines the communication setting to be used, based on the communication setting notification stored in the storage unit.

12. The radio communication system according to claim 10,
wherein the computer program of the mobile terminal further causes the processor of the mobile terminal to function as:
a measurement unit configured to measure communication performance of each communication setting, a utilization rate of a channel, or a density of the mobile terminal; and
a measurement result transmission unit configured to transmit a measurement result by the measurement unit to the RF resource allocation device.

13. The radio communication system according to claim 10, wherein the mobile terminal is a radio communication device mounted on a vehicle.

14. A radio frequency (RF) resource allocation method that distributes to a mobile terminal a communication setting notification including a communication setting to be used in a radio communication, the method comprising:
an acquisition step of acquiring communication conditions at a plurality of positions;
a generation step of determining for each region the communication setting to be used based on the communication conditions, and generating the communication setting notification that includes the communication setting for at least one region; and a transmission step of transmitting the communication setting notification to the mobile terminal.

15. A non-transitory computer readable medium in which a program for causing a computer to execute each of the steps of the method according to claim 14 is stored non-transitorily.

\* \* \* \* \*